J. HILTON.
APPARATUS FOR SOWING SEEDS.
APPLICATION FILED JULY 9, 1919.

1,317,133.

Patented Sept. 23, 1919.
3 SHEETS—SHEET 1.

Inventor
John Hilton
by
Attorney.

J. HILTON.
APPARATUS FOR SOWING SEEDS.
APPLICATION FILED JULY 9, 1919.
1,317,133.
Patented Sept. 23, 1919.
3 SHEETS—SHEET 2.
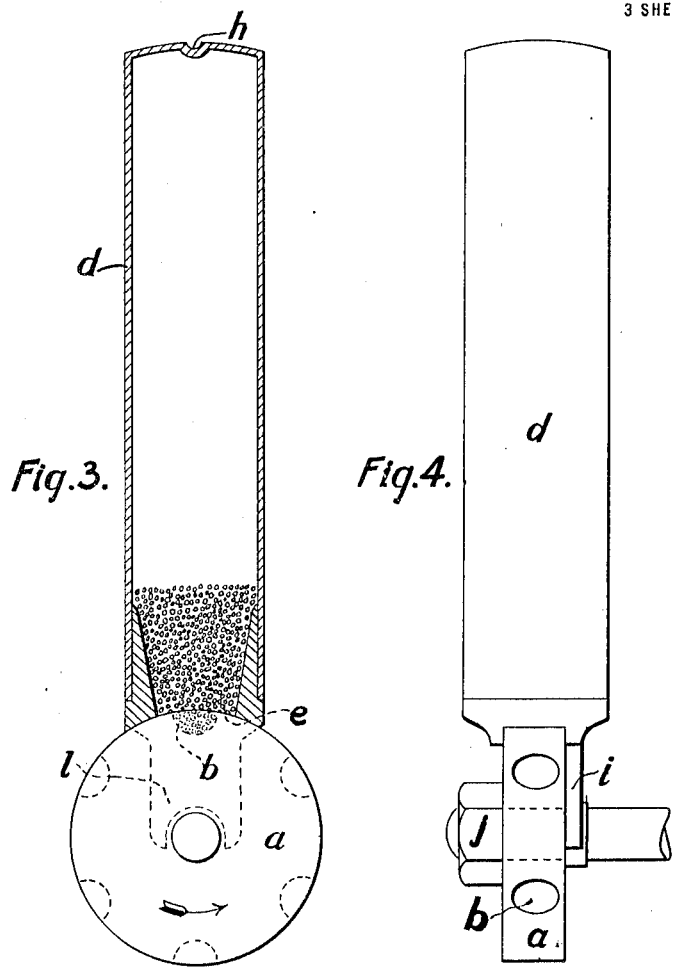
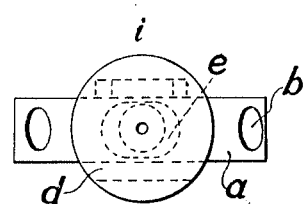
Inventor
John Hilton.

J. HILTON.
APPARATUS FOR SOWING SEEDS.
APPLICATION FILED JULY 9, 1919.

1,317,133.

Patented Sept. 23, 1919.
3 SHEETS—SHEET 3.

Inventor
John Hilton.
by [signature]
Attorney.

UNITED STATES PATENT OFFICE.

JOHN HILTON, OF WOOD SIDE, BEACONSFIELD, ENGLAND.

APPARATUS FOR SOWING SEEDS.

1,317,133.   Specification of Letters Patent.   Patented Sept. 23, 1919.

Application filed July 9, 1919. Serial No. 309,770.

*To all whom it may concern:*

Be it known that I, JOHN HILTON, a subject of the King of Great Britain and Ireland, residing at Wood Side, Beaconsfield, Bucks, England, have invented certain new and useful Improvements in Apparatus for Sowing Seeds, of which the following is a specification.

This invention relates to improved apparatus whereby vegetable, cereal, flower and other seeds are delivered in measured quantities and sown at any desired distance apart.

This invention is of that class employing a disk having one or more holes, or cavities sunk into its periphery, each of a size to receive one or more of the seeds to be sown.

Figure 1:
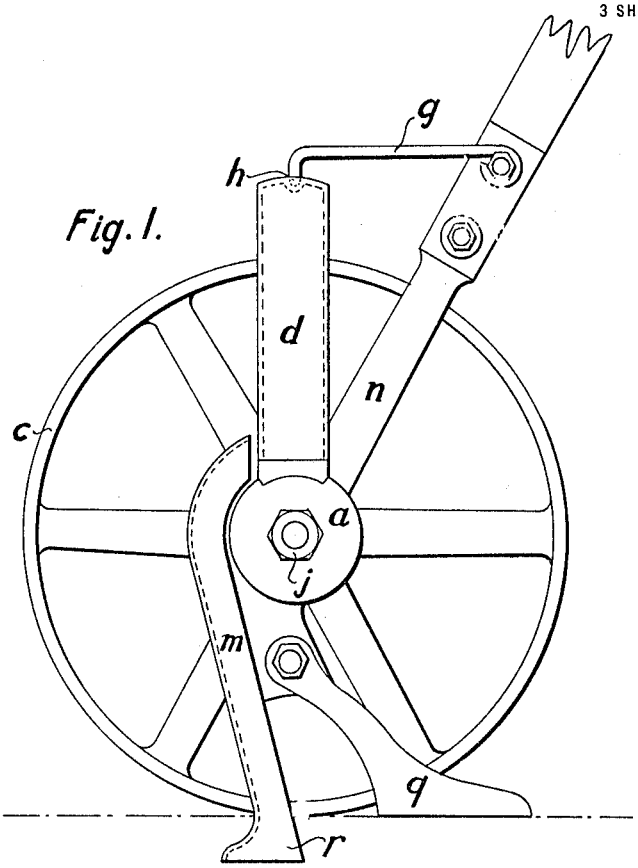
Figure 2:
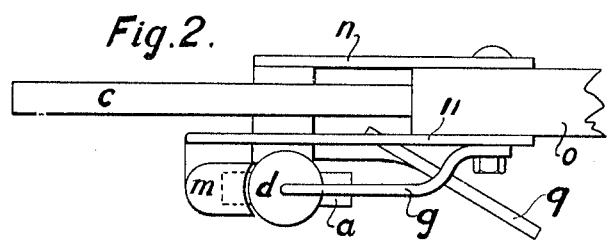
Figure 2A:
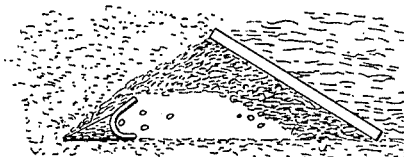
Figure 6:
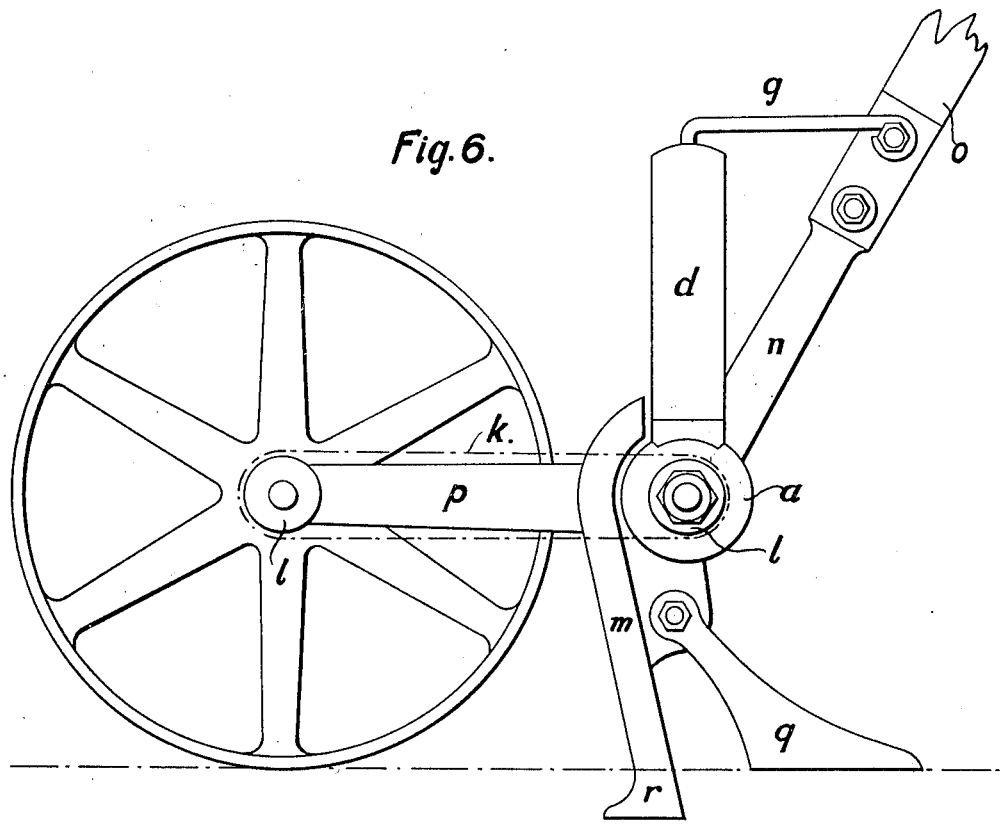

In the accompanying drawings Figure 1 is an elevation of the improved apparatus and Fig. 2 a plan. Fig. $2^a$ shows the action of a scraper attachment which may be used in conjunction with the apparatus. Fig. 3 is a section through the seed container, Fig. 4 a side view and Fig. 5 a plan of the same. Fig. 6 is an elevation of an alternative arrangement. The disk $a$ with cavities $b$ (Figs. 3, 4, and 5) may be removably secured to the axle of a wheel, $c$ (Figs. 1 and 2) so that when the wheel is run over the ground the disk rotates (as shown in Fig. 1) or the disk may be in a separate axle driven from the axle of the wheel $c$ which runs on the ground (as shown in Fig. 6).

The seed to be sown is carried in a detachable container $d$ (Figs. 1, 2, 3, 4, 5, and 6) the lower end of which has an aperture $e$ (Figs. 3 and 5) through which seeds can be introduced or discharged. This open lower end of the container rests upon the periphery of the disk, as shown in Fig. 3. So long as the disk is not rotated the seeds in the container are prevented from escaping by the periphery of the disk, which closes the aperture but when the wheel is run over the ground and the disk in consequence rotates each cavity in the disk is filled in turn with one or more seeds, and carries these seeds under a forward "lip" of the container. As the rotation proceeds the seeds fall by gravity or are thrown by centrifugal force out of the cavity. In Fig. 3 cavity $b$ is shown filled with seeds. When disk $a$ is rotated in the direction of the arrow these seeds will be carried forward under the "lip" $f$ and be drawn or dropped from the cavity.

The container rests upon the disk in a vertical or inclined position, and is held in position by a spring. In Figs. 1, 2 and 6, this spring is shown in the form of a bent wire or strip $g$ having a pointed end detachably engaging an indentation $h$ (Figs. 1, 3 and 5) in the upper end of the container, but it may take any convenient form and may engage with any part of the container. In order to provide for wear and for adjustment of degree of pressure this spring is adjustably bolted to the handle or shaft O. The attachment and detachment of the container is effected by pushing the container under or from the spring. When free of the spring the container may be slid around the disk until its aperture is uppermost and then drawn away for emptying or charging.

In order that the portion of the container which bears upon the periphery of the disk may not rock or jump upon its seating a guide is provided in the form of a slotted projection $i$ (Figs. 3 and 4) from the container spanning the axle of the disk.

In order to facilitate the emptying and filling of the container the lower portion of the container with its aperture, lips and slotted guide, may be made detachable from the rest. In that case the lower portion may be removed when emptying or filling is necessary. This detachable portion is seen clearly in Fig. 3.

The quantity of seed delivered by each cavity is determined by the size of the cavity in relation to the size of the seed. The distance between the two deposits of seed will vary with the spacing of the indentations around the periphery of the disk, and in order that a disk appropriate to the desired distance and measure may be fitted, provision is made for the ready detachment and attachment of disks to the axle. In Figs. 1 and 4 this provision is shown in the form of a nut $j$ which holds the disk against a shoulder of the axle. Where the disk is on an axle other than the axle of the ground-wheel the spacing of the seeds can also be varied by driving the disk by change-speed toothed or chain or other gearing from the axle of the ground-wheel. In Fig. 6 the disk is shown driven by chain $k$ and its speed can be altered by changing one or both of chain wheels $i$.

The seed carried out from under the lip of the container is thrown or dropped forward, preferably into a trough $m$ (Figs. 1 and 6) down which it slides to the ground.

The curved portion of the trough is shaped so as to allow a disk to be removed or attached without need for moving or removing the trough. The trough is painted or otherwise made vivid so that the seeds may be seen as they slide along it, or is made of resonant material such as thin sheet metal, so that the impact of the seeds can be heard. By one or other of these "tell-tale" devices the operator is warned at once should the container run empty or the delivery of the seed fail from any cause. Two or more disks, each with its container or all drawn from one container, may be employed on the same axle; two or more drills being thereby sown at the same time.

The axle of the ground wheel rotates in a journal or journals formed in a frame or fork to which are secured the seat trough and other attachments, and which also carries in the case of a geared seed-disk, the axle thereof. To this frame a shaft or handle $o$ (Figs. 1, 2 and 6) is fixed so that the apparatus may be run along the ground. In Figs. 1 and 2 this fork is shown built up of two plates $n$ bolted to the sides of the shaft or handle $o$. In Fig. 6 the plates are shown with extensions $p$ spanning the ground-wheel and having at their outer ends holes in which the axle of the ground-wheel runs. To one of the plates $n$ the seed trough or pipe is secured.

This frame may also, if desired, carry means for opening the drill in front of the seed trough, and closing it after the seed is deposited. The manner of accomplishing this is shown in Figs. 1, 2 and 6. The lower end of the seed trough is carried down below the ground level and, being pressed into the ground as the apparatus is pushed forward, opens in the soil a drill into which the seeds slide, and the disturbed soil is pushed back into the drill, thereby covering the seeds, by scraper $q$. In order to avoid trouble due to the gathering of soil and stones in a V-shaped or two bladed scraper, it would be necessary if the soil were thrown up at both sides of the drill, the drill forming end of the seed trough or pipe ($r$, Figs. 1 and 6) may be shaped like the breast of a plow to throw the soil up on one side only of the drill whence it can be pushed back by the single inclined scraper $q$ (this action is shown in Fig. 2ª) or may be a thin blade set slantwise to push the earth to one side of the drill as it gets through the ground.

The apparatus may also carry an adjustable side-trailing bar of any customary pattern for marking the position of the next drill.

Claims:

1. In an apparatus for sowing seeds the combination of a disk having one or more holes or cavities sunk into its periphery each of a size to receive one or more seeds to be sown, and a detachable seed container resting at its lower end upon the periphery of the cavitied disk and held in position by a spring.

2. In an apparatus for sowing seeds the combination of a disk having one or more holes or cavities sunk into its periphery each of a size to receive one or more seeds to be sown, and a detachable seed container resting at its lower end upon the periphery of the cavitied disk and held in position by a spring, the lower end of the seed container being removable for convenience in charging.

3. In an apparatus for sowing seeds the combination of a disk having one or more holes or cavities sunk into its periphery each of a size to receive one or more seeds to be sown, a detachable seed container resting at its lower end upon the periphery of the cavitied disk and held in position by a spring and a projection in the lower end of the seed container slotted to span the axle of the cavitied disk.

4. In an apparatus for sowing seeds the combination of a disk having one or more holes or cavities sunk into its periphery each of a size to receive one or more seeds to be sown, a detachable seed container resting at its lower end upon the periphery of the cavitied disk and held in position by a suitable fastening and a seed delivery trough adapted to show visually and indicate by sound the falling of the seeds.

In testimony whereof I affix my signature in presence of two witnesses.

JOHN HILTON.

Witnesses:
C. F. LOAI,
EWART S. ANDREWS.